Jan. 26, 1965 W. H. DECKER ETAL Re. 25,716
FABRIC-COVERED GARMENT-BUTTON ASSEMBLING DEVICE
Original Filed Oct. 27, 1958
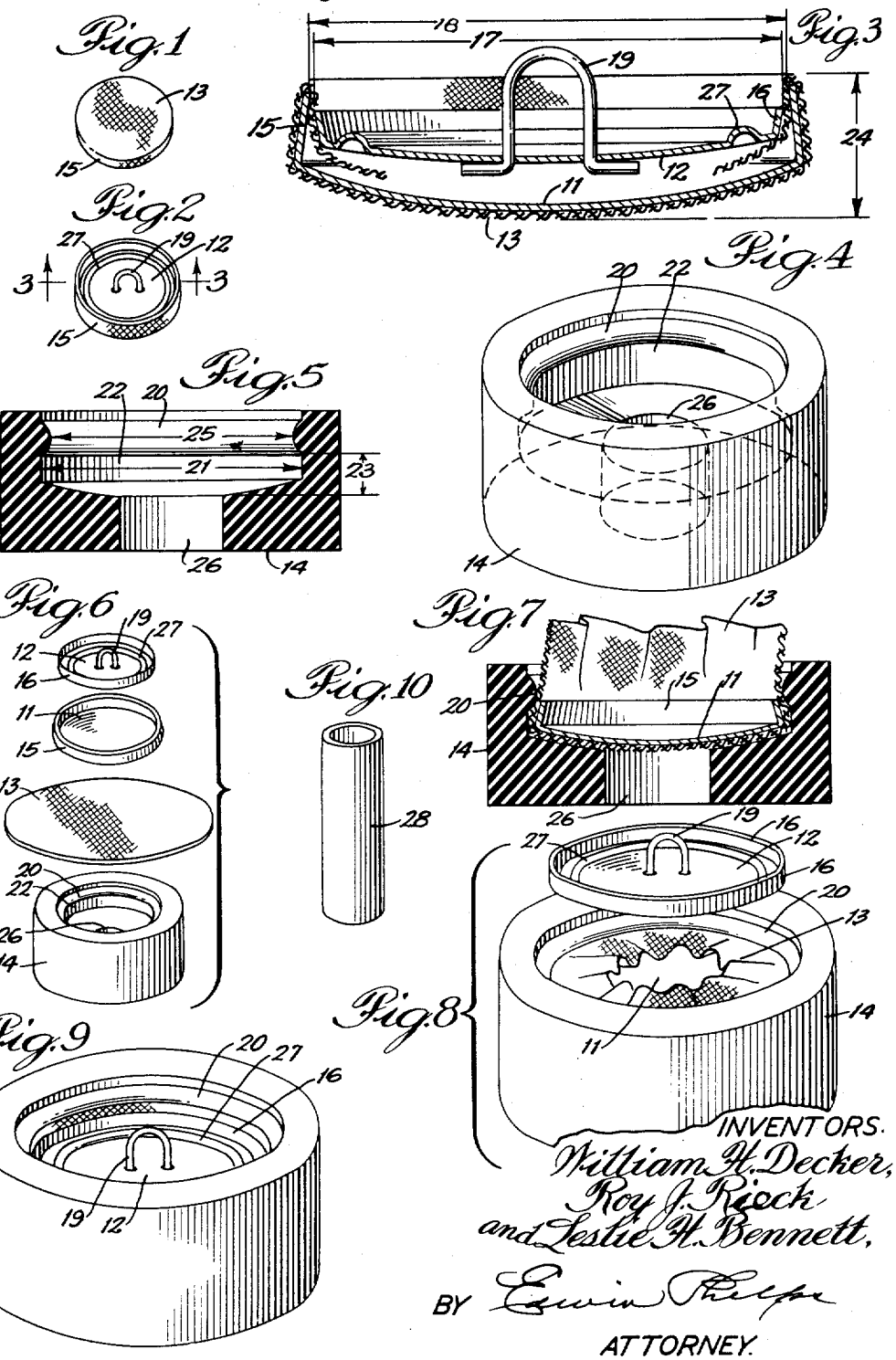
INVENTORS.
William H. Decker,
Roy J. Rieck
and Leslie H. Bennett,
BY Erwin Philipp
ATTORNEY.

United States Patent Office

Re. 25,716
Reissued Jan. 26, 1965

25,716
FABRIC-COVERED GARMENT-BUTTON ASSEMBLING DEVICE

William H. Decker, Roy J. Rieck, and Leslie H. Bennett, Cook County, Ill., assignors to Maxant Button and Supply Co., Chicago, Ill., a corporation of Illinois Original No. 2,943,520, dated July 5, 1960, Ser. No. 769,689, Oct. 27, 1958. Application for reissue July 19, 1963, Ser. No. 301,229
1 Claim. (Cl. 79—5)

Matter enclosed in heavy brackets [ ] appears in the original patent but forms no part of this reissue specification; matter printed in italics indicates the additions made by reissue.

This invention relates to a device for assembling a garment button formed by two nested improved-form of flanged disks with a piece of fabric overlaying the face of the outer disk, as set forth in copending application Serial No. 694,611, filed November 7, 1957.

Buttons of this kind generally are used on feminine garments. It is a conventional practice for dressmakers to make such fabric-covered buttons using pieces of the fabric from which a garment is made, or pieces of fabric which acceptably could be associated with the garment fabric. Metal disks for the making of such type of button are obtainable through channels which market dressmaking accessories.

The main objects of this invention are to provide an improved form of device for assembling an improved form of fabric-covered buttons; to provide an improved form of button-assembling device for use with a pair of flanged disks dimensioned to be permanently retained in interlocked nested relationship by the perimetrical portion of the fabric, which overlies the face of the outer disks, being interposed between the disk flanges; to provide an improved form of button assembling device of this kind adapted to tauten a piece of fabric over the face of one flanged disk and position the perimetrical portion of the fabric within the disk flange to permit a second flanged disk to be depressed into the first disk and become permanently retained in nested relationship by the intervening fabric; and to provide an improved fabric-covered button-assembly device of this kind which is simple in construction, very economical to manufacture, and extremely facile to use.

In the embodiment of this invention shown in the accompanying drawings:

FIG. 1 is an obverse view of a fabric-faced garment-button formed in an assembling device constructed in accordance with this invention;

FIG. 2 is a reverse perspective view of the same;

FIG. 3 is a much-enlarged transverse sectional vew of the finished button, taken on the plane of the line 3—3 of FIG. 2;

FIG. 4 is a perspective view of the device wherein the various parts of the button are assembled;

FIG. 5 is a transverse sectional view of the same;

FIG. 6 is an exploded view of the several parts involved in the assembling of buttons with a device constructed in accordance with this invention;

FIG. 7 is an enlarged, transverse sectional view of the first step in producing buttons with an assembling device constructed in accordance with this invention;

FIG. 8 is an exploded perspective view of two subsequent steps in producing the buttons;

FIG. 9 is a perspective view of the finished button in the assembling device just before the removal of the completed button such as shown in FIG. 3, and FIG. 10 is a perspective view of an auxiliary tool used to press the disks into their assembled relationship especially with extremely small buttons, constructed in accordance with this invention.

The essential concept of this invention involves a pair of perimetrically-flanged curved outer and inner disks predeterminedly dimensioned relatively and formed with oppositely-tapered flanges and an elastic cup-shaped element with an inwardly-extending rib so dimensioned with respect to the outer disk and so positioned in the cup cavity as to permit the superimposed assembly of the disks and a piece of fabric and interpose the perimetrical portion of the fabric between the flanges and thereby lock the disks in permanently nested relationship with the fabric tautened over the face of the outer disk.

An improved garment-button and assembling device embodying the foregoing concept comprises a pair of disks 11 and 12, each having a concave inner face, in association with a piece of fabric 13, and an assembling element 14.

As set forth in the aforesaid copending application, the disks 11 and 12, one the outer disk and the other the inner disk, preferably are curved in form, made of stamped, and preferably resilient, metal, of differing diameters at their bases and have perimetrical flanges 15 and 16, respectively, extending axially outward from the concave faces of the respective disks. As here shown, the disk 12 has an annular ridge or rib 27 embossed adjacently inward of the flange 16. Although the disk 12 might be formed plain, without any such rib, the rib 27 tends to enhance the resiliency of the perimetrical portion of the disk 12. This not only makes it easier to press the disk 12 into the disk 11 with the interposed fabric, but tends to increase the pressure of the flange 16 outwardly toward the flange 15 on the disk 11 with the interposed fabric 13.

For an outer disk, about ⅞ of an inch in diameter, the flange 15 is approximately ⅛ of an inch in axial height. For an inner disk 12, about ¾ of an inch in diameter the flange 16 is approximately 1/16 of an inch in axial height.

The flange 15 on the outer disk 11 is tapered radially inward from the concave face, whereas the flange 16 on the inner disk 12 is tapered radially outward from the concave face.

The relative tapers of these flanges 15 and 16 are such that the outside diameter 17 (FIG. 3) of the flange 16, at its outer edge, is approximately the same as or very slightly less than the inside diameter 18 (FIG. 3) of the flange 15 at its outer edge. Such diametrical difference generally would be less than the thickness of the heaviest fabric most likely to be used for button making with disks 11 and 12 of the above-noted dimensions.

The inner disk 12 has a central eye 19, whereby the finished button may be attached to the garment. As here shown, the eye is a looped wire with the oppositely-disposed bent-over ends extending through apertures in the disk 12 with the loop enough above the plane of the flange 16 to permit insertion of a needle.

The button assembling device, as here shown, is a cup-shaped element 14 formed of elastic substance with an internal annular rib 20. The inside diameter 21 of the cavity 22 is substantially equal to the outside diameter of the finished fabric-faced button, hence slightly larger than the outside diameter of the outer disk 11. The rib 20 is arcuate in form and axially spaced from the base of the cavity 22 so that the distance 23 (FIG. 5) is substantially the same as the over-all thickness of 24 of the finished button (FIG. 3). The inside diameter 25 of the rib is just enough less than the dimension 21 to insure retention of the outer disk 11 with a piece of fabric 13 spread over the convex face *and bias the fabric inwardly over the edge of the flange 15* (see FIG. 7). As here shown, a central opening 26 is formed in the base of the element 14 to facilitate the ejection of the formed button.

Having a quantity of disks 11 and 12, the necessary pieces of fabric 13, and one of the elements 14, all as above set forth, the method of assembling a fabric-faced garment-button, in accordance with this invention, involves the following steps:

(1) A piece of fabric 12 is placed concentrically over the open end of the element 14;

(2) The outer disk 11 is superimposed on the piece of fabric 13 and pressed down into the element 14 past the rib 20 into the cavity 22 of the element 14, as clearly indicated in FIG. 7;

(3) The perimetrical portion of the fabric 13 is folded down into the disk 11, as shown in FIG. 8;

(4) The inner disk 12 is superimposed on the folded-over portion of the fabric 13 (see FIG. 3) and the disk 12 pushed down into the disk 11 (see FIGS. 9 and 3).

Pressing the disk 12 down into the disk 11, with the fabric interposed between the flanges 15 and 16, tends to spring the perimeters of the flanges 15 and 16 sufficiently to permit the perimeter of the flange 16 to pass below the fabric-covered perimeter of the flange 15 (see FIG. 3). The interposed fabric, drawn over the perimeters of the flanges 15 and 16, and the resiliency of the disks, serves to lock the disks 11 and 12 in permanently-nested relationship. Also, the combined action of pressing the fabric down into the element 14 and pressing the disk 12 down into the disk 11 tends to tauten the fabric 13 over the convex face of the outer disk 12.

(5) Finally, the finished button is pressed out of the element 14 and is ready for use.

Where sheer fabric is to be used to face the disk 11, a piece of lining would be used to insure enough thickness of fabric to insure the retention of the inner disk 11 in the outer disk 12, as is certain to be the case with the more heavy fabric.

Kits of a dozen or so pair of disks 11 and 12 and one of the elements 14 are adapted for marketing, through dress-making accessory outlets, for purchase by professional dressmakers or by persons who practice making their own clothes, to enable them to make fabric-faced buttons to match the garment, when such type of button is desired.

The hollow cylinder 28 shown in FIG. 10, is provided for use to push the disks into the element 14, especially when the diameters of the disks 11 and 12 are too small to effect this with the fingers of one's hand.

Variations and modifications in the details of structure and arrangement of parts may be resorted to within the spirit and coverage of the appended claims.

We claim:

[1. A device for assembling a pair of flanged disks and a piece of fabric in superimposed relationship to form a fabric-covered garment-button, the device comprising an elastic material element recessed inwardly from one face to form an annular cavity of a diameter slightly greater than the outside diameter of the outer disk and having an inwardly-extending rib intermediate the base of the cavity and the one face of the element with the inside diameter of the rib approximating the outside diameter of the outer disk.]

[2. A device for assembling a pair of flanged disks and a piece of fabric in superimposed relationship to form a fabric-covered garment button, the device comprising an elastic material element recessed inwardly from one face to form an annular cavity of a diameter slightly greater than the outside diameter of the outer disk and having an inwardly-extending rib intermediate the base of the cavity and the one face of the element with the inside diameter of the rib approximating the outside diameter of the outer disk, the element having an axial opening extending from the base of the cavity to the other face of the element.]

[3. A device for assembling fabric-covered garment buttons from a pair of perimetrically-flanged concaved outer and inner disks of differing diameters wherein the flange of the outer disk is tapered axially inward and the flange of the inner disk is tapered axially outward and has an outside diameter slightly smaller than the inside diameter of the outer-disk flange at the outer edge, the device comprising an elastic material element recessed inwardly from one face to form an annular cavity of a diameter slightly greater than the outside diameter of the outer disk and having an inwardly-extending rib intermediate the base of the cavity and the one face of the element with the inside diameter of the rib approximating the outer diameter of the outer disk.]

*4. A device for assembling an outer and inner pair of flanged discs in permanently interlocked nested relationship by the interposed marginal portion of a piece of fabric overlying the outer face of the outer disc to form a fabric-covered garment button, the device comprising a one-piece elastic element having an upwardly-open cavity therein with a base portion sufficiently closed to support thereon the outer disc with the fabric tautened thereover and also prevent the fabric-covered disc from passing beyond the base portion of the cavity, and rib means spaced above the base portion of the cavity a distance substantially equal to the height of the outer disc flange and serving to maintain the outer disc, with the tautened fabric thereon, on the base portion of the cavity, the rib means also serving to bias the fabric inwardly over the outer-disc flange to facilitate folding the fabric into the outer disc preparatory to depressing the inner disc into the outer disc over the folded-in fabric to complete the formation of the fabric-covered button within the cavity subject to the removal of the button from the element.*

References Cited by the Examiner

The following references, cited by the Examiner, are of record in the patented file of this patent, or the original patent.

UNITED STATES PATENTS

| | | | |
|---|---|---|---|
| 323,803 | 8/85 | French. | |
| 2,488,957 | 11/49 | Booth. | |
| 2,869,203 | 1/59 | Dugan et al. | 79—5 |
| 2,930,093 | 3/60 | Dritz | 24—113 |

FOREIGN PATENTS

| | | |
|---|---|---|
| 407,578 | 1/10 | France. |

FRANK E. BAILEY, *Primary Examiner.*